United States Patent

[11] 3,545,735

| [72] | Inventors | Herbert Wolf;<br>Wilhelm Goesele; Siegfried Schreiner; Hans Stumpfl, Ludwigshafen(Rhine); Friedrich Hettler, Bad Duerkheim, Germany |
|---|---|---|
| [21] | Appl. No. | 759,315 |
| [22] | Filed | Sept. 12, 1968 |
| [45] | Patented | Dec. 8, 1970 |
| [73] | Assignee | Badische Anilin & Soda-Fabrik Aktiengesellschaft Ludwigshafen(Rhine)Land Rhineland-Pfalz, Germany |
| [32] | Priority | Sept. 15, 1967 |
| [33] | | Germany |
| [31] | | No. 1,667,392 |

[54] CONVEYANCE OF DUSTY MATERIAL IN MULTISTAGE FLUIDIZED-BED PLANT
2 Claims, 1 Drawing Fig.

[52] U.S. Cl. ............................................. 266/20,
23/277, 23/284, 55/218, 55/432, 55/459
[51] Int. Cl. .............................................. F27b 15/00,
B04c 5/04
[50] Field of Search ................................... 55/218,
459, 219, 428—432, 19—468; 209/144, 211;
210/512; 23/288, 277, 284; 222/64; 266/20, 13

[56] References Cited
UNITED STATES PATENTS

| 2,379,411 | 7/1945 | Berges | 209/211 |
|---|---|---|---|
| 2,391,863 | 1/1946 | Bowen | 55/431 |
| 2,760,595 | 8/1956 | Pynor | 55/432 |
| 2,830,674 | 4/1958 | Dolf et al. | 55/218 |
| 3,045,828 | 7/1962 | Hume | 55/459 |
| 3,212,240 | 10/1965 | Streete | 55/431 |
| 3,264,800 | 8/1966 | Wittmann | 55/1 |
| 2,848,381 | 8/1958 | Nicholson | 55/431 |
| 3,208,831 | 9/1965 | Belden | 23/288.3 |
| 3,300,091 | 1/1967 | Wondrak et al. | 222/64 |

Primary Examiner—Frank W. Lutter
Assistant Examiner—Bernard Nozick
Attorney—Johnston, Root, O'Keeffe, Keil, Thompson & Shurtleff ABSTRACT: The dust entrained from a previous fluidized-bed reactor with the offgas in a multistage plant for the production of gases containing sulfur dioxide by roasting materials-containing arsenic and antimony as well as roastable sulfur, is separated in a cyclone. The dust separated is supplied to the next fluidized-bed reactor. An intermediate chamber is interposed between the discharge from the cylone and the next fluidized-bed reactor and this intermediate chamber is capable of being closed at its lower end by a slide which is actuable in dependence on the level of the material in the intermediate container.

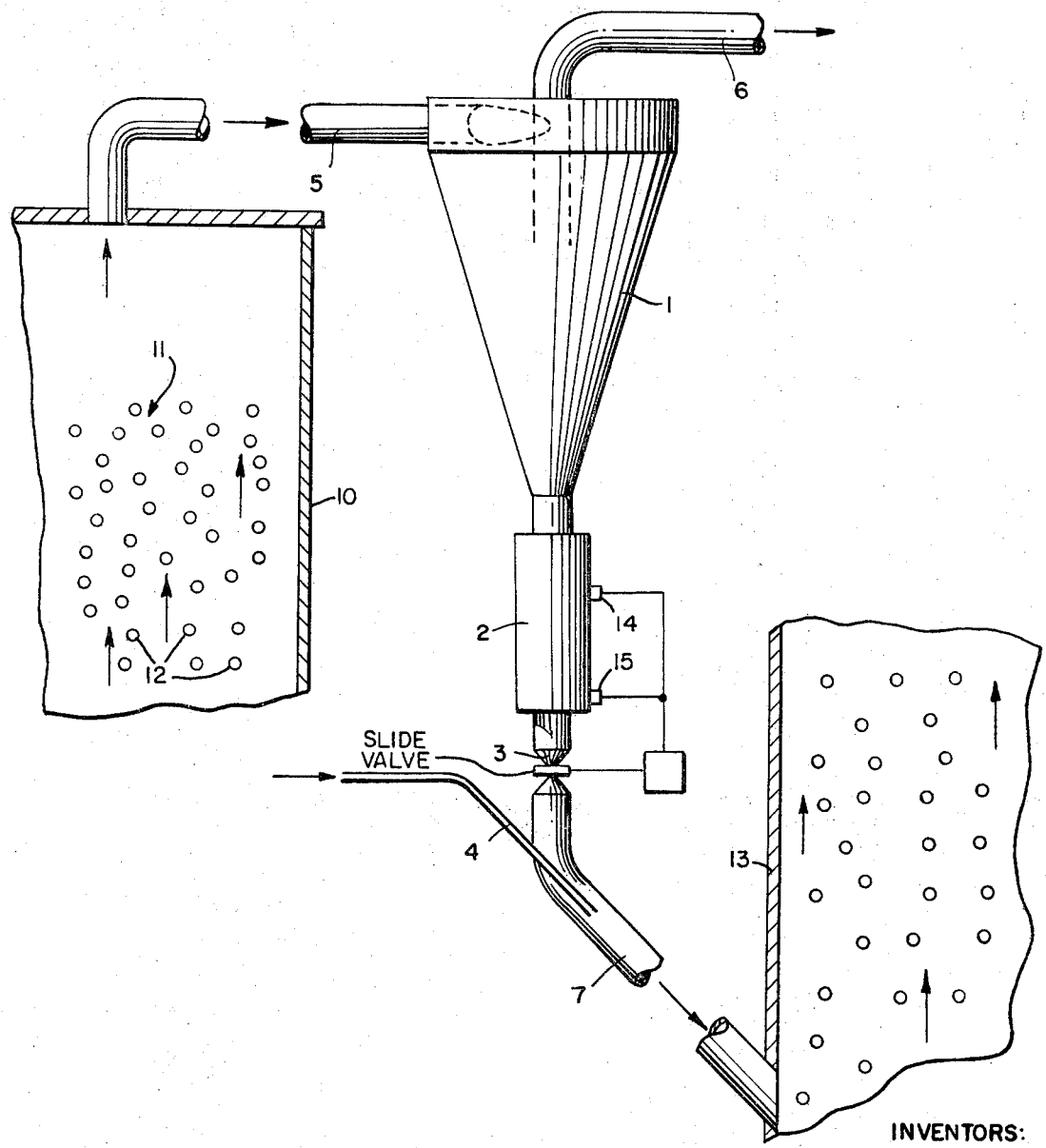

CONVEYANCE OF DUSTY MATERIAL IN MULTISTAGE FLUIDIZED-BED PLANT

In the roasting of materials, for example pyrites, which contain arsenic and antimony as well as roastable sulfur, in a single-stage fluidized-bed roasting plant the major part of the arsenic and antimony contained in the material to be roasted remains in the roasted material. The arsenic and antimony cannot be removed from this roasted material, even in a subsequent chloridizing roasting followed by leaching, because the antimony and arsenic are present in the roasted material as antimonate and arsenate. Smelting of such roasted material, however, provides considerable difficulties.

According to a method described in U.S. Pat. No. 2,889,203, the said disadvantage may be avoided by carrying out the roasting of such sulfurous materials-containing arsenic and/or antimony in a plurality of successive fluidized-beds, the oxygen-containing gas required for the roasting being supplied separately to the individual fluidized-beds. The amount of oxygen supplied to the first stage is so limited that a solid intermediate roasted product consisting mainly of ferrous sulfide and ferro-soferric oxide is obtained whose content of sulfur in sulfidic combination is at least 5 percent, preferably at least 15 percent. The arsenic and/or antimony are thus volatilized with the gas from roasting. The intermediate product is then completely roasted in the following fluidized-bed or beds and it is necessary to ensure that there is no contamination of the material in the first fluidized-bed material from the following fluidizedbed or beds. This is necessary because the volatilization of arsenic or antimony in the first stage is greatly impaired by the presence of ferric oxide which is formed from the intermediate roasted product in the following stage or stages. For this reason it is also necessary to prevent oxygen from the gases from roasting in the subsequent fluidized-bed or beds from passing into the first fluidized-bed and being able to react therein with the formation of ferric oxide.

The gases from roasting in the first stage are substantially freed from entrained dust in a cyclone by this method. The gases from roasting leaving the cyclone contain the whole antimony the arsenic and antimony as gaseous compounds and are freed from them by a conventional method before they are further processed. The dust is supplied (together with the roasted intermediate product from the first fluidized-bed) to the next roasting stage. This supply of the dust separated in the cyclone to the next fluidized bed reactor offers peculiar difficulties. Since it is impossible to avoid fluctuations in pressure in the two reactors, oxygen containing gas may pass from the second reactor through the cyclone above the first reactor into the first reactor and there impair or prevent volatilization of arsenic and antimony for the reasons given above. In the case of severe pulsation, slagging may even occur in the delivery pipe and in the cyclone because the fine sulfurous material burns with additional evolution of heat.

It is known from US. U.S. Pat. No. 3,264,800 that intermediate roasted product withdrawn from the first fluidized-bed reactor can be united with the dust separated in the hot cyclone and supplied to the next fluidized-bed reactor through a discharge pipe. It is possible by appropriate regulation of the length of this discharge pipe to compensate for any static pressure differences between two reactors and in this way to prevent a disadvantageous exchange of gas between the two reactors. This apparatus has the disadvantage, however, that when the throughput fluctuates it cannot be adapted to the prevailing conditions so that in these cases penetration of gas cannot be reliably prevented.

The present invention has as its object the provision between two successive fluidized-bed reactors of equipment which connects them together through a cyclone for the separation of dusty material from the gas from roasting which is attached to the first reactor. Satisfactory transference of the dusty material discharged from a fluidized-bed reactor to the next fluidized-bed reactor is made possible by this equipment, and at the same time breadthrough of gas between the two reactors is effectively prevented.

We have found that the said object can be achieved by providing downstream of the discharge from the cyclone fragment upstream of its issuing into the next fluidized-bed reactor intermediate container which is closable at its lower end by a closure means which is actuatable in dependence on the level of material in the intermediate container.

Equipment in accordance with the invention is shown diagrammatically in the drawing with the two fluidized-bed reactors shown in fragment and in cross section.

Gas from roasting in a first fluidized-bed reactor 10 which contains entrained dust from the fluidized bed 11 of sulfur-bearing, finely divided mineral particles 12 is supplied through line 5 to a hot cyclone 1. The gas devoid of dust is withdrawn through line 6 and the dust deposited is supplied to an intermediate container 2 which can be closed at the bottom by a closure means 3 such as a slide. The dust is kept in this intermediate container up to a predetermined level which is sufficiently high to ensure reliably that when the closure means is opened there cannot be any breakthrough of gas from the second fluidized-bed reactor 13 into the cyclone and the first fluidized-bed reactor. When a predetermined maximum level of the dust has been reached, the closure means is opened and dust is supplied through line 7 to the next reactor. Emptying of the intermediate container continues until the minimal level of the dust has been reached at which gas exchange between the two fluidized-bed reactors is prevented. The closure means is then closed.

Operation of the closure means is regulated by measurement of the level of the dust in the intermediate container. This may be carried out by any conventional method, for example capacitively by means of ultrasonics or by means of radioactive indication. For this purpose the container is advantageously provided with a maximum contact 14 which opens the closure means at the predetermined maximum level, and a minimum contact 15 which shuts the closure means again at the predetermined minimum level. The dust which has been deposited in the cyclone is thus supplied in batches to the second reactor by the equipment.

A jet jet 4 is also shown in the drawing; the opening of the jet points in the direction of the stream of dust being discharged. Inert gas such as steam or nitrogen may be injected into line 7 through the jet and this will facilitate conveyance of the discharged dust into the next fluidized-bed reactor. It is not essential to provide this jet but it is included in an advantageous embodiment of the equipment according to this invention.

It is not necessary for inert gas to be injected through this jet all the time but the injection need take place only when the closure means is open.

It is possible with the equipment according to this invention to supply dust separated in a cyclone associated with a first fluidized-bed reactor to another fluidized-bed reactor downstream of the same in a problem-free manner. The equipment is very flexible and can be adapted to the prevailing conditions without difficulty by simple adjustment of the minimum levels. No slagging takes place in the equipment even after operation over a period of several months and the arsenic content in the roasted material withdrawn from the second fluidized-bed reactor in a two-stage plant is less than 0.04 percent by weight.

The equipment according to this invention is relatively small as compared with the fluidized-bed reactors. Thus in the case of fluidized-bed reactors having a maximum throughout of 150 metric tons per day of $SO_3$ the intermediate container 2 is as a rule about 1.00 to 1.50 meters in length and has a diameter of 0.7 to 1.0 meter. These dimensions may be made larger or smaller in the case of plant having larger or smaller fluidized-bed reactors.

The invention is illustrated by the following Example.

EXAMPLE

A. The preroasting furnace of a two-stage fluidized-bed plant is charged per square meter of roasting surface per hour with 4,000 cubic meters of air and 5 metric tons of iron pyrites having a content of 46.7 percent of sulfur and 0.4 percent of arsenic. The level of the fluidized-bed is kept at 1 meter. The temperature in the fluidized-bed is 850°C and the temperature in the cyclone attached to the first fluidized-bed reactor for the separation of dust contained in the offgas from the first fluidized-bed reactor is 800°C. the dust separated in the cyclone is introduced into the second fluidized-bed reactor.

3.83 metric tons per hour of preroasted material having a sulfur content of 30 percent is introduced into the second reactor. After a mean operating period of fifty hours, the cyclone 1 is slagged and has to be cleaned. The completely roasted material, i.e. the material withdrawn from the second reactor, still contains 0.11 percent of arsenic.

B. In an otherwise identical plant but in which an intermediate container 2 in accordance with this invention is interposed between the discharge from the cyclone and the second fluidized-bed reactor, the arsenic content of the completely roasted material is 0.04 percent. There is no disturbance by slagging even after the plant has been operating for three months.

We claim:

1. Apparatus for the fluidized-bed roasting of sulfur-bearing, finely divided mineral particles which comprises a first reactor adapted to roast finely divided minerals maintained in a fluidized-bed by an upwardly flowing stream of hot, roasting gases, a tube connected with said rector for discharging the offgas, a cyclone separator connected with said first reactor via said tube for separating finely-divided solids entrained in said offgas, a solids discharge passage at the bottom of said separator for discharging the separated solids downwardly therefrom, a second reactor adapted to roast finely divided minerals maintained in a fluidized bed by an upwardly flowing stream of hot, roasting gases, downwardly-extending conduit means connecting said solids discharge passage of said separator and said second reactor, a hollow container in said conduit immediately below said passage for collecting and accumulating the solid particles discharged into said conduit means, closure means in said conduit means adjacent the lower end of said container, solids-level-sensing means for sensing predetermined upper and lower levels of accumulated solids in said container, and means operably connected with said sensing means for opening said closure means when the accumulated solids reach said upper predetermined level and for closing said closure means when said accumulated solids reach said lower level, whereby the body of accumulated solids always present in said container prevents backflow of gas from said second reactor to said first reactor and said cyclone.

2. Apparatus as claimed in claim 1, and a jet located in said conduit means downstream of said closure means for injecting into said conduit means in the downstream direction a stream of gas for conveying said particles in the downstream direction toward said second reactor.